Rogers & Black.

Steam-Boiler Water-Tube.

No. 2,130. Reissued Dec. 19, 1865.

Witnesses.
W. Albert Stall
C. Hewson.

Inventor.
Henry Howson
Atty for R. E. Rogers
and J. Black

UNITED STATES PATENT OFFICE.

ROBERT E. ROGERS AND JAMES BLACK, OF PHILADELPHIA, PA.

IMPROVEMENT IN STEAM-BOILERS.

Specification forming part of Letters Patent No. 41,323, dated January 19, 1864; Reissue No. 2,130, dated December 19, 1865.

*To all whom it may concern:*

Be it known that we, ROBERT E. ROGERS and JAMES BLACK, both of the city of Philadelphia, in the State of Pennsylvania, have invented a certain new and useful Improvement in Steam-Boilers; and we do hereby declare the following to be a full, clear, and exact description of the same, reference being had to the accompanying drawings, and to the letters of reference marked thereon.

Our invention consists of a steam boiler constructed as described hereinafter, with the view of obtaining an extended heating-surface, a free circulation of water within the boiler, facilities for rapidly raising the steam and maintaining it at an uniform pressure by the use of a comparatively small amount of fuel, the boiler being at the same time simple in construction, of a form to insure strength, readily secured in its proper position within the fire-chamber, and easily repaired.

In order to enable others skilled in the construction of steam-boilers to make our invention, we will proceed to describe its construction and operation, reference being had to the accompanying drawings, which form a part of this specification.

Figure 2:
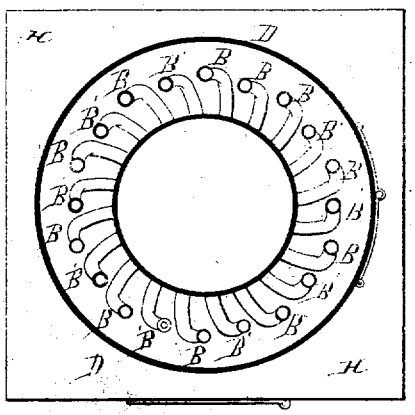
Figure 1:
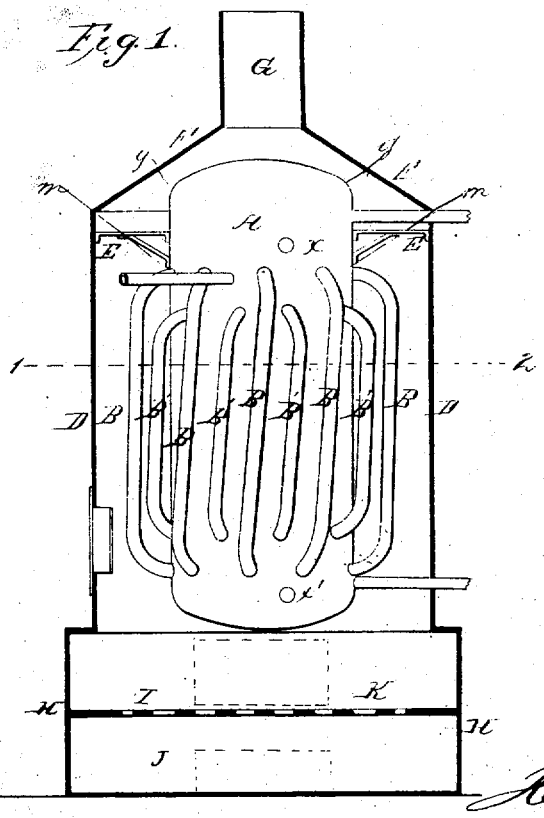

Figure 1 is a vertical section of our improved steam-boiler; and Fig. 2, a sectional plan on the line 1 2, Fig. 1.

A is the body of the boiler, and consists of a hollow vertical cylinder rounded at the opposite ends.

B B are a series of tubes arranged round the body of the boiler and at a short distance from the same, each tube being bent at both ends, and the bent ends being secured to the body A.

Between the tubes B a series of similar but shorter tubes, B′, are arranged round the body of the boiler and secured to the same.

By connecting the upper ends of the tubes B to the boiler at points above those where the tubes B′ are secured, and by adopting the same plan with the lower ends of the tubes, the piercing of the body of the boiler at points t o near each other is avoided, and a great number of tubes are obtained without wounding the boiler. More or less tubes than are shown in the drawings might be used. Thus a tube or tubes might be secured to the boiler, the upper end on a line with the point $x$ and the lower end at the point $x'$, or at some other point above or below $x'$, and similar tubes secured at corresponding points might be carried round the boiler and secured to the same without diminishing from its strength. In fact, the number of the tubes employed must depend in a great measure upon the length and diameter of the body of the boiler. The boiler, with its tubes, is shown in the present instance as being secured near the top, by means of brackets E, to the interior cylindrical casing D, which has a conical top, F, terminating in the smoke pipe or chimney G.

The casing D is secured to the base H, in which are the grate-bars I, the latter separating the ash-pit J from the fuel-chamber K, both of which are furnished with suitable doors.

It will be evident that the boiler may be suspended within the casing by a variety of appliances—as, for instance, to the conical top by suitable links at the lines $y$, or to the corner of the casing by links at the lines $m$, and the boiler may be connected laterally to the casing by light stays. In all cases, however, the boiler must be dependent, so far as possible, for its position within the casing, on supports connected to the boiler at or near the top of the same, the body of the boiler being otherwise unsupported and being suspended within the casing, so that its entire surface may be uncovered and exposed to the action of the products of combustion.

The casing D may be composed of brick-work, and the fuel chamber and ash-pit inclosed by brick-work; but it should be understood that the interior of the casing must in all cases have direct and open communication with the fuel-chamber. In fact, the latter and the interior of the casing may be considered as one general fire-chamber within which the boiler is suspended.

The tubes B and B′ may be vertical, and only one set or series may be used, although we prefer to arrange them in the spiral or inclined position shown, as they tend to direct the products of combustion in a spiral course to the chimney, and to thereby increase the heating action on the boiler.

The advantages of our improved boiler may be enumerated as follows: First, the tubes, which are exposed to the direct action of the products of combustion, greatly increase the heating-surface; secondly, the tubes afford a medium for the uniform and much desired circulation of water within the boiler; thirdly, by suspending the boiler within a fire-chamber and leaving its entire surface exposed to the products of combustion the steam can be raised with great rapidity and maintained at an uniform pressure by the use of a comparatively small amount of fuel; and, fourthly, the boiler is simple in its construction, is of a form which insures strength, can be easily secured in its proper position within the fire-chamber, and easily repaired, all of which advantages have been fully proved by practical tests.

It will be understood that the chimney G must be furnished with a suitable damper, and that the boiler is provided with suitable steam-pipes, feed-pipes, and other appliances.

We wish it to be understood that we do not desire to claim, broadly, the use of external tubes attached to the body A of the boiler; but

We claim as our invention and desire to secure by Letters Patent—

1. The body A of the boiler, having tubes B and B′, so arranged that they will maintain a continuous circulation of water between the upper and lower portion of the boiler when the whole or very nearly the whole of the boiler is suspended within a casing containing the fire-chamber, and is exposed to the direct action of the products of combustion, as set forth.

2. Two or more sets of tubes, B or B′, arranged on and attached to the body A of the boiler, as set forth, and for the purpose set forth.

This specification signed this 20th day of November, 1865.

R. E. ROGERS.
JAMES BLACK.

Witnesses:
SAMUEL PRICE,
W. H. SALVADOR.